(12) United States Patent
Esselink

(10) Patent No.: US 6,501,430 B1
(45) Date of Patent: Dec. 31, 2002

(54) CARRIER PROVIDED WITH AN ELETRONIC TRANSPONDER FOR IDENTIFYING ANIMALS, AND METHOD FOR PRODUCING SUCH CARRIER

(75) Inventor: Jan Esselink, Winterswijk (NL)

(73) Assignee: N.V. Nederlanse Apparatenfabriek Nedap, DC Groenlo (NL)

( * ) Notice: Subject to any disclaimer, the term of this patent is extended or adjusted under 35 U.S.C. 154(b) by 0 days.

(21) Appl. No.: 09/623,454

(22) PCT Filed: Mar. 9, 1999

(86) PCT No.: PCT/NL99/00128
§ 371 (c)(1),
(2), (4) Date: Nov. 22, 2000

(87) PCT Pub. No.: WO99/45760
PCT Pub. Date: Sep. 16, 1999

(30) Foreign Application Priority Data

Mar. 9, 1998 (NL) .............................................. 1008539

(51) Int. Cl.⁷ ................................................. H01Q 1/12
(52) U.S. Cl. .......................... 343/718; 343/895; 40/301; 340/572.1; 340/573.1
(58) Field of Search ................................. 343/718, 741, 343/742, 866, 867, 895, 872, 572.1, 572.7, 573.1, 825.36; 40/300, 301, 302

(56) References Cited

U.S. PATENT DOCUMENTS

| | | | | |
|---|---|---|---|---|
| 3,852,758 A | * | 12/1974 | Polson ........................ 343/718 |
| 4,635,389 A | * | 1/1987 | Oudelette .................... 40/301 |
| 4,653,208 A | * | 3/1987 | Wassilieff .................... 40/301 |
| 4,718,697 A | * | 1/1988 | Berardus van Amelsfort ... 206/309 |
| 4,953,313 A | * | 9/1990 | Scott ........................... 40/301 |
| 5,339,051 A | * | 8/1994 | Koehler et al. ............. 310/318 |
| 5,625,366 A | * | 4/1997 | D'Hont ....................... 343/718 |
| 6,012,415 A | * | 1/2000 | Linseth ....................... 119/174 |

FOREIGN PATENT DOCUMENTS

WO WO93/22907 11/1993

\* cited by examiner

*Primary Examiner*—Tan Ho
(74) *Attorney, Agent, or Firm*—Jacobson Holman PLLC

(57) ABSTRACT

The carrier is designed as an ear stud and is composed of a disk-shaped first part (1) having a circular lateral edge (4) which is raised relative to a first side (2) of the first part (1) and which is provided with a circular slot (6) accommodating the antenna winding (22) of a transponder. An electronic component (20) of the transponder is arranged on the first side (2) of the first part (1). A cylindrical second part (16) extends from a first side (2) of the disk-shaped first part (1) in a direction away from the first side (2). The carrier is provided with a passage (12) extending, via the second part (16), from a second side (28) of the first part (1) located opposite the first side (2) of the first part (1) to the first side (2) of the first part (1), for attaching a label (32) to the carrier. The first part (1) has its first side (2) and its lateral edge (4) provided with a covering material applied by means of an injection-molding process and covering the antenna winding (22) and the electronic component (20).

12 Claims, 1 Drawing Sheet

CARRIER PROVIDED WITH AN ELETRONIC TRANSPONDER FOR IDENTIFYING ANIMALS, AND METHOD FOR PRODUCING SUCH CARRIER

BACKGROUND OF THE INVENTION

1. Field of the Invention

The invention relates to a carrier provided with an electronic transponder consisting of at least one electronic component and one antenna winding for identifying animals, wherein the carrier is designed as an electronic ear tag and, in use, can be connected to another element, such as a fastening pin of an ID label.

The invention also relates to a method for producing a carrier provided with an electronic transponder having at least one antenna winding and at least one electronic component for identifying animals, wherein the prepared carrier is designed as an electronic ear tag and, in use, can be connected to another element, such as a fastening pin of an ID label.

2. The Prior Art

Such carriers and methods are generally known. A drawback of the known carrier and method is that the carrier is manufactured by means of a relatively expensive injection-molding process. In this known process, a disk-shaped part comprising the transponder is covered on all sides by means of an injection-molding process. Such injection-molding process is complicated and hence expensive.

SUMMARY OF THE INVENTION

The object of the invention is to provide a solution to this problem. Accordingly, the carrier according to the invention is characterized in that the carrier is composed of a disk-shaped first part having a circular lateral edge which is raised relative to a first side of the first part and which is provided with a circular slot accommodating the antenna winding of the transponder, and a tubular second part, wherein the electronic component of the transponder is arranged on the first side of the first part, the second part extends from the first side of the first part in a direction away from the first side, the second part is provided with a receiving space which is at least accessible via an access opening in a second side of the first part located opposite the first side, for receiving the fastening pin of the ID label, and wherein the first part has its first side and its lateral edge provided with a covering material applied by means of an injection-molding process and covering the antenna winding and the electronic component.

Since, according to the invention, the disk-shaped first part is covered with the covering material only on the first side and on its circular lateral side, the injection-molding process for applying this material can be carried out in a relatively simple and hence inexpensive manner.

Accordingly, the method according to the invention is characterized in that the method comprises at least the following steps:

1. in a disk-shaped first part having a circular lateral edge which is raised relative to a first side of the first part and provided with a circular slot, the antenna winding is fitted in the slot and the electronic component is fitted on the first side of the first element; and
2. by means of an injection-molding process, the first part has its first side and its lateral edge provided with a covering material covering the electronic component and the winding.

A further cost-increasing aspect of the known carrier and method is that for adjusting the carrier to, for instance, the dimensions of the fastening pin of the ID label to which it is to be attached, the dimensions of the entire carrier, i.e. the dimensions of the disk-shaped part, have to be adjusted. Typically, the disk-shaped part is likewise produced by means of injection-molding process. This means that for different dimensions of the disk-shaped part, different molds are required. Because the disk-shaped part with the circular slot has a fairly complicated shape, the manufacture of a mold is a costly affair. Hence, if different molds for different dimensions of the carrier have to be manufactured, this is a relatively costly affair. In accordance with a particular variant of the invention, this problem is met. Accordingly, the particular embodiment of the carrier is characterized in that the first and the second part are not directly fixedly interconnected. Because only the relatively simple second part should be adapted to the specific use of the label, this implies that only simple, different molds for the different second parts should be manufactured. The mold for the first part, which is technically more complicated, can be maintained unchanged, i.e., can be employed for any desired use.

The method according to this particular variant of the invention is characterized in that the carrier is further provided with a tubular second part, wherein, before the injection-molding process is carried out, the loose first and second parts are assembled to form one whole, wherein the second part extends from the first side of the first part in a direction away from the first side, the second part is provided with an receiving space which is at least accessible via an access opening in a second side of the first part located opposite the first side, for receiving the fastening pin of the ID label, and wherein the first part has its first side and its lateral edge provided with a covering material applied by means of an injection-molding process and covering the antenna winding and the electronic component.

BRIEF DESCRIPTION OF THE DRAWING

The invention will now be specified with reference to the accompanying drawing. In this drawing.

DESCRIPTION OF THE INVENTION

Figure 1:
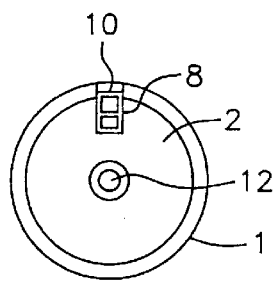
FIG. 1 is a top plan view of a disk-shaped first part of a carrier according to the invention.
Figure 2:
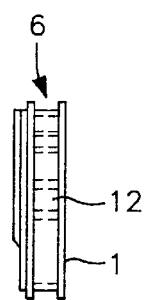
FIG. 2 is a side elevation of the first part according to FIG. 1.
Figure 3:
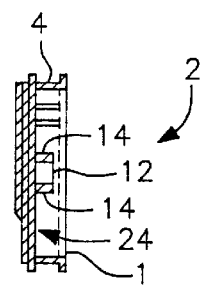
FIG. 3 shows a cross section of the first part according to FIG. 1.

In FIGS. 1–3, reference numeral 1 designates a disk-shaped first part of a carrier according to the invention. The disk-shaped first part 1 is provided with a circular lateral edge 4 which is raised relative to a first side 2 of the first part. Located in the lateral edge 4 is a circular slot 6. The first part 1 is further provided, on its first side 2, with a compartment 10 surrounded by walls 8 and open at its top side. Approximately at the center of the first part, an opening 12 is present. On its first side, the first part is provided, around its opening 12, with a raised edge 14.

Figure 4:
FIG. 4 is a top plan view of a cylindrical second part of the carrier according to the invention.
Figure 5:
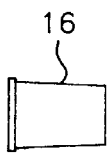
FIG. 5 is a side elevation of the second part according to FIG. 4.
Figure 6:
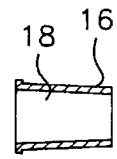
FIG. 6 shows a cross section of the second part according to FIG. 4.

In FIGS. 4–6, reference numeral 16 designates a possible embodiment of a tubular second part of the carrier according to the invention. The tubular second part 16 is provided with a receiving space 18.

For manufacturing the end product, an electronic component 20 of a transponder is fitted in the compartment 10. Further, at least one winding 22 is fitted in the slot 6. This winding is also connected to the at least one electronic part 20.

Figure 7:
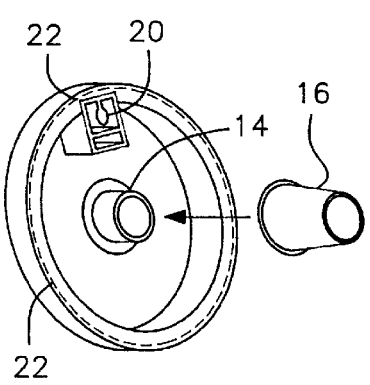
FIG. 7 shows, in perspective, the first part according to FIGS. 1–3 and the second part according to FIGS. 4–6 before being assembled.
Figure 8:
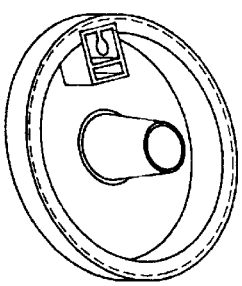
FIG. 8 shows, in perspective, the first and the second part after being assembled.
Figure 9:
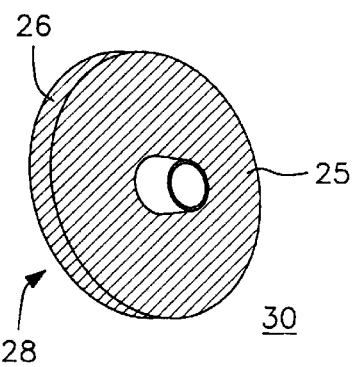
FIG. 9 shows the assembly according to FIG. 8 after it has been covered with a covering material by means of an injection-molding process.

As shown in FIGS. 7 and 8, the second part 16 is mounted on the first part. Hence, in FIG. 8, it applies that the second part extends from the first side 2 of the first part in a direction away from the first side. On the second side of the first part, the opening 12 forms an access opening to the receiving space 18 of the second part 16. Next, by means of an injection-molding process, a covering material 25 is applied to the first side 2 and the lateral edge 4 of the first part (hatched in FIG. 9). The covering material also covers the electronic component 20 and the winding 22. In other words, the slot 6 and the disk-shaped inner space 24 located between the raised lateral edge 4 and the second part 16 are filled with the covering material. Such injection-molding process can be performed in a fairly simple and, accordingly, inexpensive manner. The covering material used for covering thus forms a smooth surface on the first side 2 of the carrier. Likewise, a smooth surface is formed on the lateral side 26 of the carrier. On the second side 28 located opposite the first side, the first disk-shaped part 1 has a smooth surface formed by the disk-shaped first part itself.

After injection molding, the carrier 30 (see FIG. 9) is ready for use as an ear tag. If so desired, an ID label 32, comprising a fastening pin 34 whose free end is provided with a thickening 36, can be attached to the carrier by inserting the pin into the receiving space 18 via the access opening 12. The thickening 36 has a conical shape, enabling it to be manipulated with some force past the raised edge 14. However, once the thickening 36 is located in the receiving space 18, it can no longer be removed from the receiving space 18 via the access opening 12.

Depending on the dimensions of the ID label, i.e. the dimensions of the fastening pin 34 and the thickening 36, the dimensions of the second part can be selected. The advantage is that the first disk-shaped part can be applied universally. Only the dimensions for the second part need to vary. This means that only for the second part, different molds have to be manufactured for the varying dimensions of the label. Since the second part is relatively simple, the manufacture of different molds for different second parts having different dimensions does not involve many costs.

Figure 10:
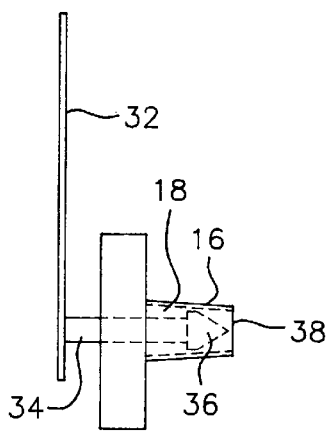
FIG. 10 shows a cross section of the carrier according to the invention when provided with a label.

Through selection of a second part suitable therefor, the receiving space can be provided with a second access opening 38. In this example, this second access opening 38 is provided in the free end of the second part. In use, the thickening 36 of the fastening pin 34 is located in the receiving space 18 (see FIG. 10). When it is desired that the label be replaced by another label, so that the carrier can be reused, the fastening pin 34 is cut through. The label can then be removed, while the thickening 36 can be manipulated out of the receiving space 18 via the second access opening 38.

Figure 11:
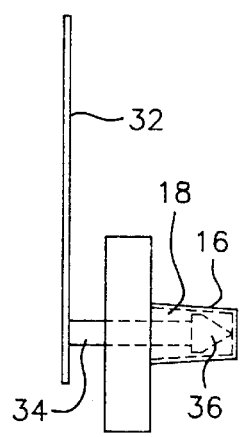
FIG. 11 shows a cross section of an alternative embodiment of the carrier according to the invention when provided with a label.

By selecting the diameter of the second access opening 38 so as to be sufficiently small, it can be effected that the thickening 36 cannot be removed from the receiving space anymore. The carrier is then not suitable for reuse. In this last case, it is of course also possible to give the free end of the second part an entirely closed design (see FIG. 11), so that the thickening 36 can certainly not be removed from the receiving space 18 when the pin 34 is cut through. In this respect, it is observed that the thickening 36 cannot be removed from the receiving space via the first access opening 12 either, due to the dimensions of the raised edge 14.

The invention is by no means limited to the embodiment outlined hereinabove. For instance, the first party could also be of square, rectangular or polygonal, rather than disk-shaped, design. Further, the transponder may be provided with more windings instead of one winding. During the manufacturing process of the carrier, these windings can be arranged on the first part before or after the second part is mounted on the first part. Such variants are each understood to fall within the framework of the invention.

What is claimed:

1. A carrier provided with an electronic transponder consisting of at least one electronic component and one antenna winding for identifying animals, the carrier being designed as an ear stud and connected to a label, the carrier comprises a disk-shaped first part having a circular lateral edge raised relative to a first side of the first part and provided with a circular slot accommodating the antenna winding of the transponder, and a cylindrical second part, the electronic component of the transponder being arranged on the first side of the first part, the second part extends from the first side of the first part in a direction away from the first side, the second part is provided with a receiving space which is at least accessible by an access opening in a second side of the first part located opposite the first side, for receiving a fastening pin of the label, and the first part has its first side and its lateral edge provided with a covering material applied by an injection-molding process and covering the antenna winding and the electronic component.

2. The carrier according to claim 1, wherein the first part and the second part are not directly fixedly interconnected.

3. The carrier according to claim 2, wherein the first part has its first side provided with a raised edge extending into the receiving space of the second part.

4. The carrier according to claim 1, wherein the fastening pin of the label extends from the second side of the first part, through the access opening, into the receiving space of the second part.

5. The carrier according to claim 4, wherein a free end of the fastening pin is provided with a thickening located in the receiving space.

6. The carrier according to claim 5, wherein the receiving space is provided with a second access opening located in the second part for removing the thickening when the fastening pin is cut through for separating the label and the carrier so that the carrier is suitable for reuse.

7. The carrier according to claim 5, wherein the dimensions of the thickening and the receiving space are adjusted to each other such that when the fastening pin is cut through, the thickening cannot be manipulated out of the receiving space.

8. A method for producing a carrier provided with an electronic transponder having at least one antenna winding and at least one electronic component for identifying animals, wherein the carrier being designed as an ear stud and connected to a label, the method comprises at least the following steps:

in a disk-shaped first part having a circular lateral edge which is raised relative to a first side of the first part and provided with a circular slot, the antenna winding is fitted in the slot, and the electronic component is fitted on the first side of the first element, and by means of an injection-molding process, the first part has its first side and its lateral edge provided with a covering material covering the electronic component and the winding.

9. The method according to claim 8, wherein the carrier further comprises a cylindrical second part, wherein before the injection-molding process is carried out, the loose first and second parts are assembled into one whole, wherein the second part extends from the first side of the first part in a direction away from the first side, the second part is provided with a receiving space which is at least accessible via an access opening in a second side of the first part located opposite the first side, for receiving a fastening pin of the label.

10. The method according to claim 9, wherein dimensions of the second part are selected on a basis of dimensions of the fastening pin of the label which will be connected to the carrier.

11. The method according to claim 9, wherein the second part having a second access opening is used for producing the carrier when in the carrier, and the thickening should be removable from the receiving space when the fastening pin is cut through.

12. The method according to claim 8, wherein dimensions of the second part can selectively be adjusted to a desired use of the carrier.

* * * * *

UNITED STATES PATENT AND TRADEMARK OFFICE
CERTIFICATE OF CORRECTION

PATENT NO.    : 6,501,430 B1
DATED         : December 31, 2002
INVENTOR(S)   : Jan Esselink Page 1 of 1

It is certified that error appears in the above-identified patent and that said Letters Patent is hereby corrected as shown below:

<u>Title page,</u>
Item [73], Assignee, please change "Nederlanse" to -- Nederlandsche --.

Signed and Sealed this

Second Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,501,430 B1
DATED : December 31, 2002
INVENTOR(S) : Jan Esselink

It is certified that error appears in the above-identified patent and that said Letters Patent is hereby corrected as shown below:

<u>Title page,</u>
Item [54], Title, please change "ELETRONIC" to -- ELECTRONIC --.

Signed and Sealed this

Twenty-eighth Day of December, 2004

JON W. DUDAS
*Director of the United States Patent and Trademark Office*